United States Patent [19]
Schychuck

[11] Patent Number: 5,649,804
[45] Date of Patent: Jul. 22, 1997

[54] PICK AND PLACE MACHINE

[76] Inventor: James Schychuck, 7 Depot St., Penn, Pa. 15675

[21] Appl. No.: 440,373

[22] Filed: May 12, 1995

[51] Int. Cl.$^6$ .................................................. B65G 47/00
[52] U.S. Cl. .......................... 414/751; 414/749; 414/225; 901/12
[58] Field of Search .................... 414/749, 750, 414/751, 225; 901/10, 11, 12

[56] References Cited

U.S. PATENT DOCUMENTS

| | | | |
|---|---|---|---|
| 2,867,185 | 1/1959 | Hoyward | 901/12 |
| 3,921,822 | 11/1975 | Dixon | 901/12 |
| 3,988,938 | 11/1976 | Nagai | 74/53 |
| 4,036,374 | 7/1977 | Woltjen | 901/12 |
| 4,037,732 | 7/1977 | Orlando et al. | 414/749 |
| 4,095,699 | 6/1978 | O'Neill | 198/486 |
| 4,666,367 | 5/1987 | Sticht | 901/11 |
| 4,740,134 | 4/1988 | Dixon | 414/225 |

FOREIGN PATENT DOCUMENTS

| | | | |
|---|---|---|---|
| 2659261 | 9/1991 | France | 901/12 |
| 158523 | 6/1990 | Japan | 901/12 |
| 4064524 | 2/1992 | Japan | 901/12 |

*Primary Examiner*—David A. Bucci
*Assistant Examiner*—Gregory A. Morse
*Attorney, Agent, or Firm*—Lawrence R. Burns

[57] ABSTRACT

This invention discloses a pick and place machine operable to pick up a part at a loading station and to thereafter place and release the part in a delivery station spaced at least horizontally from the loading station. The pick and place machine comprises a housing and a first member supported by the housing. The first member has free horizontal reciprocal movement on the housing with respect to the pick-up and delivery stations. A second member is supported by the first member for reciprocal movement between the first member and the pick-up and delivery stations. A rotatable post with opposing ends is mounted through the first member and has an actuating arm on one end and a follower arm on the opposing end. The follower arm has opposing ends with a follower on one end and a pivot mechanism connected to the second member on the other end. Guides are provided on the housing for engaging the follower and co-operating elements of sliding abutment means are provided on the guides and the follower. An actuator is provided on the housing for reciprocal actuation of the actuator arm.

6 Claims, 5 Drawing Sheets

5,649,804

PICK AND PLACE MACHINE

BACKGROUND OF THE INVENTION

This invention has to do with a pick and place machine which transfers a production part from a loading station to a delivery station. It is especially concerned with a pick and place machine operating by a single actuator means that provides two directions of travel. Usually two horizontal directions of travel will be contemplated, although it is possible to have both a horizontal and vertical direction of travel depending on the orientation of the pick and place machine.

In the automation and production lines, it has become a standard practice for mechanisms to surround a production part, grip the part, and transfer it from one work station to another so that further processing of the production part may take place. The efficiency of the production line ideally requires that the transfer of the part from one production process to another be minimized. Toward this goal, devices known as pick and place machines are coming into existence so as to move the production part a very short distance from one location to another.

The pick and place machines require a moving member and a gripping member that may automatically extend so that it surrounds the part and then grips the part. Once the part has been engaged, the moving member is then retracted so that the part is taken out of its production environment. When the part has been removed from production environment sufficiently so that it may be moved without interference with the production line, a different motion must be applied to the part, usually a horizontal motion, to move it from one location to another. When the part has arrived at the new location, the moving member must then extend in a horizontal or vertical direction to place the part in its new location, at which point the grippers release the part and the moving member is retracted.

The actuation or actuators of the pick and place machines are usually comprised of air cylinders or fluidized cylinders, although electrical actuators may also be used. In general, the actuators are unidirectional in that they reciprocally extend and retract in a linear fashion upon energization. There are pick and place machines on the market today that use multiple linear actuators, one for each direction of travel that may be required for the pick and place carriage. In the usual case, a first reciprocal linear horizontal motion is required on the gripper arm, and a separate air cylinder provides that reciprocal motion. The pick and place machine requires a second direction of travel, usually at 90 degrees to the first direction of travel, and a second linear air cylinder is supplied to provide reciprocal motion in that direction.

Other devices have been suggested that utilize the single actuator. Such a device is illustrated in U.S. Pat. No. 4,095,691 to James P. O'Neil.

The goal of any pick and place machine is to make its operation as simple as possible while also maximizing the repeatability of its operation. Simple and efficient machines are almost always achieved when the complexity of the machine is reduced and the interaction between the parts is simplified as much as possible. Reliability increases in the direct proportion to the reduction of parts and interactions on the pick and place machines. In addition to the foregoing factors, the precision and tolerances of the pick and place machines are important and sometimes critical to the placement of the part from one location to another during production. For this reason, the preciseness of the location of the part of the pick up and delivery points is also important in these machines along with their reliability.

OBJECTS OF THE INVENTION

It is an object of the invention to provide a simple, efficient and reliable pick and place machine utilizing a single reciprocal actuating means for its operation.

It is an object of the invention to provide a pick and place machine that has a unique mechanism that provides two reciprocal modes of horizontal travel from a single reciprocally moveable actuating device.

It is an object of the invention to provide a more inexpensive and reliable pick and place machine with a single actuating device.

It is a further object of the invention to provide a more inexpensive and reliable single actuator pick and place machine having an extreme degree of precision with regard to the pick and place locations.

It is a further object of the present invention to provide a pick and place machine having independently adjustable gripper extension strokes for the pick up and delivery of a part.

It is a further object of the present invention to provide a pick and place machine that requires a minimum of automation controls to operate.

SUMMARY OF THE INVENTION

According to the present invention a pick and place machine is provided that is operable to pick up a part at a loading station and to thereafter place and release the part in a delivery station spaced at least horizontally from said loading station. The pick and place machine comprises a housing having a first member for free horizontal reciprocal movement on the housing with respect to the pick-up and delivery stations. A second member is supported on the first member for reciprocal movement between the first member and the pick-up and delivery stations. A rotatable post with opposing ends is mounted through the first member and has an actuating arm on one end and a follower arm on the opposing end. The follower arm has opposing ends with follower means on one end and a pivot mechanism connected to the second member on the other end. There is provided guide means on the housing for engaging the follower means along with co-operating elements of sliding abutment means on the guide means and the follower means. Preferably the guide means comprises an elongate rail mounted on the housing with the rail having two opposing radiused ends. Alternately, the guide means may comprise two radiused discs 302 and 304 spaced a predetermined distance apart on the housing and a band of thin metal material 320 extending on the periphery 316 and 318 of the discs 302 and 304 and between the discs. An actuator means mounted on the housing provides for reciprocal actuation of the actuator arm. Preferably the actuator means comprises a piston-cylinder apparatus mounted on the housing and connected to the actuating arm. Alternately the actuator arm comprises a pinion, and said actuator means comprises reciprocal moving rack and pinion means.

DETAILED DESCRIPTION OF THE INVENTION

While there is shown and described herein certain specific structures embodying the invention, it will be manifest to those skilled in the art that various modifications and rearrangements of the parts may be made without departing from the spirit and scope of the underlying inventive concept, and that the same is not limited to the particular forms shown herein and described insofar as indicated by the scope of the appended claims.

Figure 1:
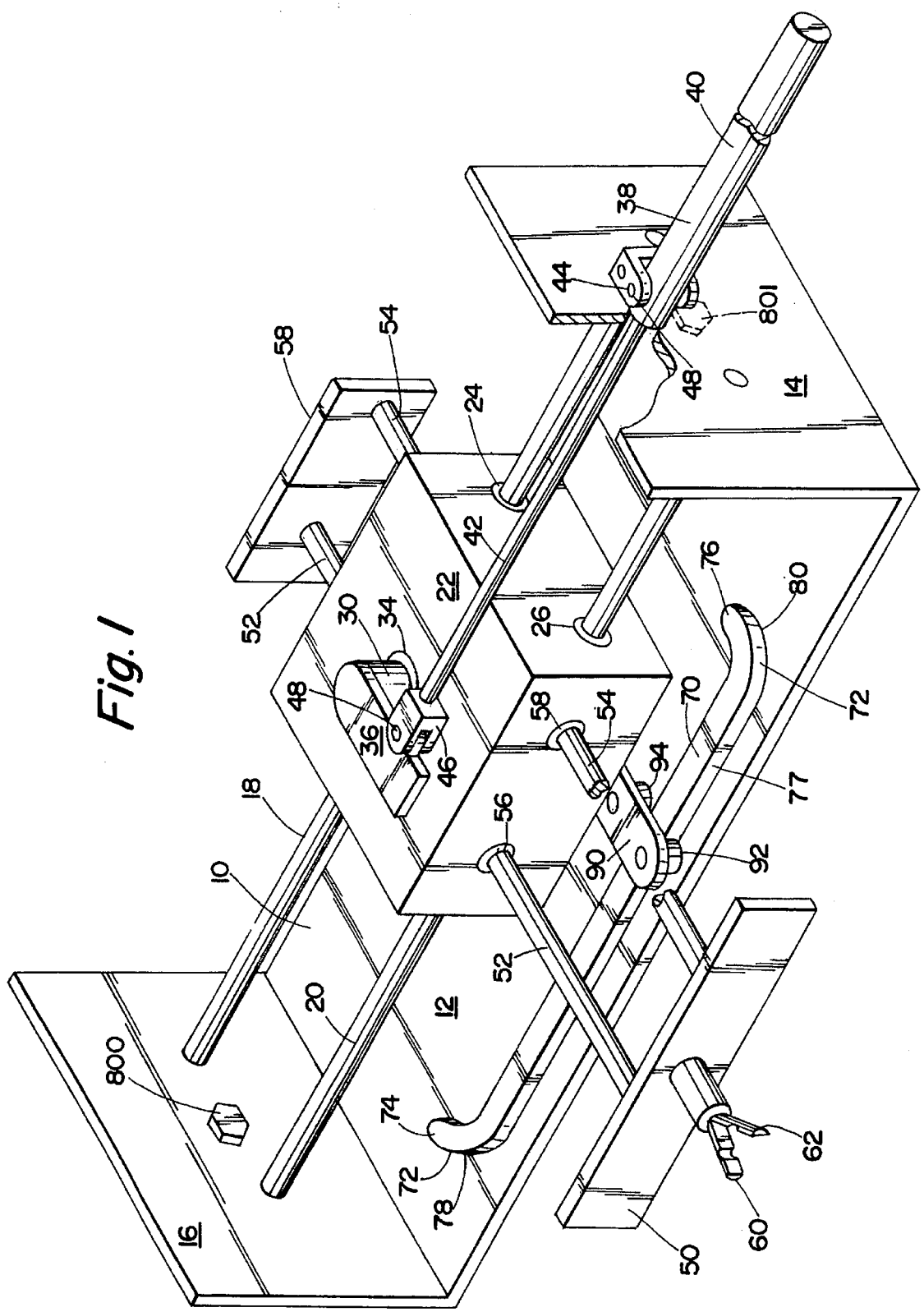
FIG. 1 is a perspective view of the pick and place machine according to the present invention.

What is shown in FIG. 1 is a pick and place machine 10 having a housing 12 with sides 14 and 16. Mounted on sides 14 and 16 are travel stops 800 and 801. Between the sides 14 and 16 are longitudinal transverse rails 18 and 20 that carry a first member 22 for reciprocal movement between the travel stops 800 and 801. Linear bearings 24 and 26 ride on the rails 18 and 20 and allow the first member 22 to traverse the length of the rails 18 and 20 between travel stops 800 and 801. Located through the body of the first member 22 is a central rotatable post shown at 30 that is rotatably mounted within the first member 22 that has a bearing 34 mounted thereon to assist in the rotation at post 30. An actuator arm 36 is attached to one end of the central post 30 so that it may attach to an actuator mechanism shown at 38 on the upper part of the side 14. The actuator mechanism 38 has a cylinder 40 having a reciprocal rod 42 that may extend and retract from the body 38. The actuating member has connections 44 and 46 either of which may be used to attach to the actuator arm 36 at connection point 48. The connection 46 connects to the actuator arm 36 at 48 then the connection 44 of the actuator 38 may connect to either one of the sides 14 or 16 on the housing 12 of the pick and place machine 10.

A second set of linear bearings 56 and 57 in first member 22 carry rods 52 and 54. Connected to one end of rods 52 and 54 is member 58. Connected to the opposite end of rods 52 and 54 from member 58 is a gripper member 50 that connects to the rods 52 and 54 so as to travel in conjunction with gripper member 50. Member 50 is reciprocally moveable so that it can extend and retract from the first member 22. Gripper member 50 may have gripper arms 60 and 62 that may be used to grip and release a production part (not shown) that will be moved from a pick up point to a transfer point, being a predetermined horizontal distance between the pick up point and a transfer point. Located on the housing 12 is a guide rail 70 that has a cam surface 72 thereon that is precisely machined so as to control the movement of the first member 22 and the second member 50. The guide rail 70 has curved opposing ends shown at 74 and 76. Each of the curved ends has a precisely machined curvature shown at 78 and 80 that ideally will have an identical radius of curvature so that the movement of member 22 and that of 50 will be precisely controlled during the operation of the pick and place machine 10. The lower part of the central post 30 has a follower arm 90. The follower arm in this case has followers 92 and 94 that are in abutting contact with the guiderail 70.

Figure 2:
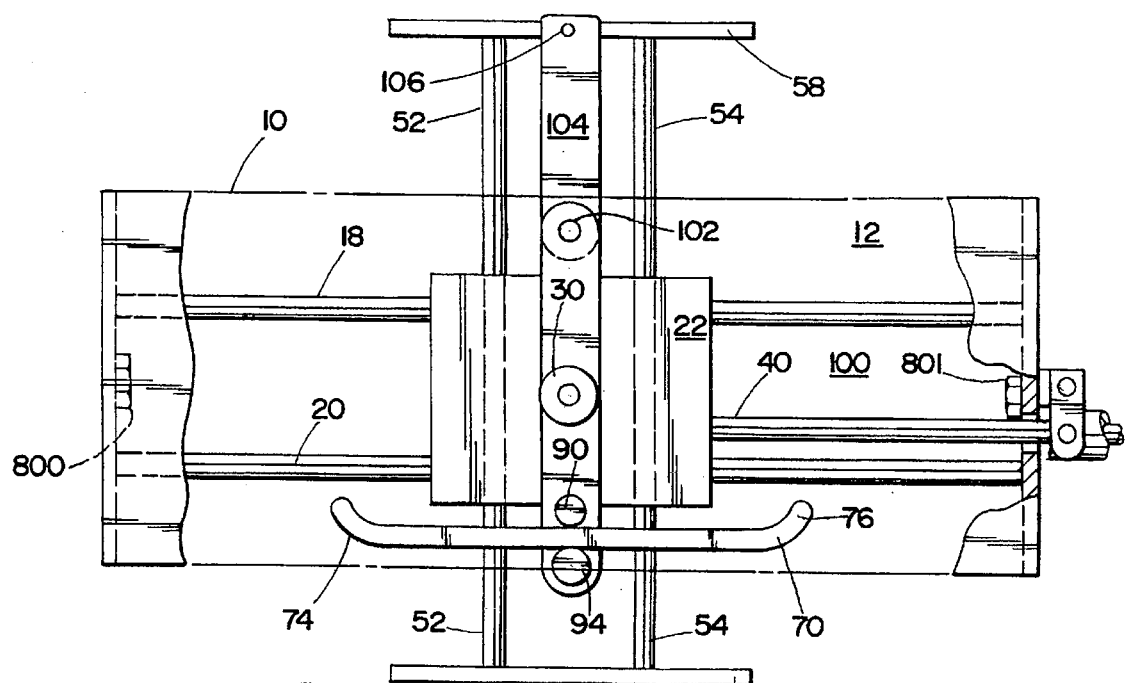
FIG. 2 is a bottom view of an extended position of the pick and place machine shown in FIG. 1.

What is shown in FIG. 2 is a bottom view of the pick and place machine 10 shown in FIG. 1. The member 22 has a bottom face 100 and rides on the rails 18 and 20 as previously explained in FIG 1. Rods 52 and 54 carry the member 50 in a reciprocal fashion so that it may travel, extend and retract from the first member 22. The grippers 60 and 62 are shown on member 50 so that they may pick up and place a production piece from a pick up point to a delivery point spaced a horizontal distance apart. The follower arm 90 is shown with the follower 92 and 94 attached thereto and abutting the guiderail 70. The follower arm 90 is shown attached to the bottom of the central post 30, having a pivot end 102 that meets with a pivot member 104 which is attached to the member 58 previously mentioned in FIG. 1.

Pivot member 104 has a pivotal connection 106 to member 58 and is designed so that horizontal or reciprocal motion along the rails 18 and 20 may be achieved by the extension and retraction to the actuator 40 shown in FIG. 1. The actuator 40 will cause the entire member 22 to move to the left or right of FIG. 2 until stopped by travel stops 800 or 801. Continued movement of actuator 40 causes the center post 30 to rotate which in turn causes followers 92 and 94 to traverse the curved section 76 or 74.

Figure 3:
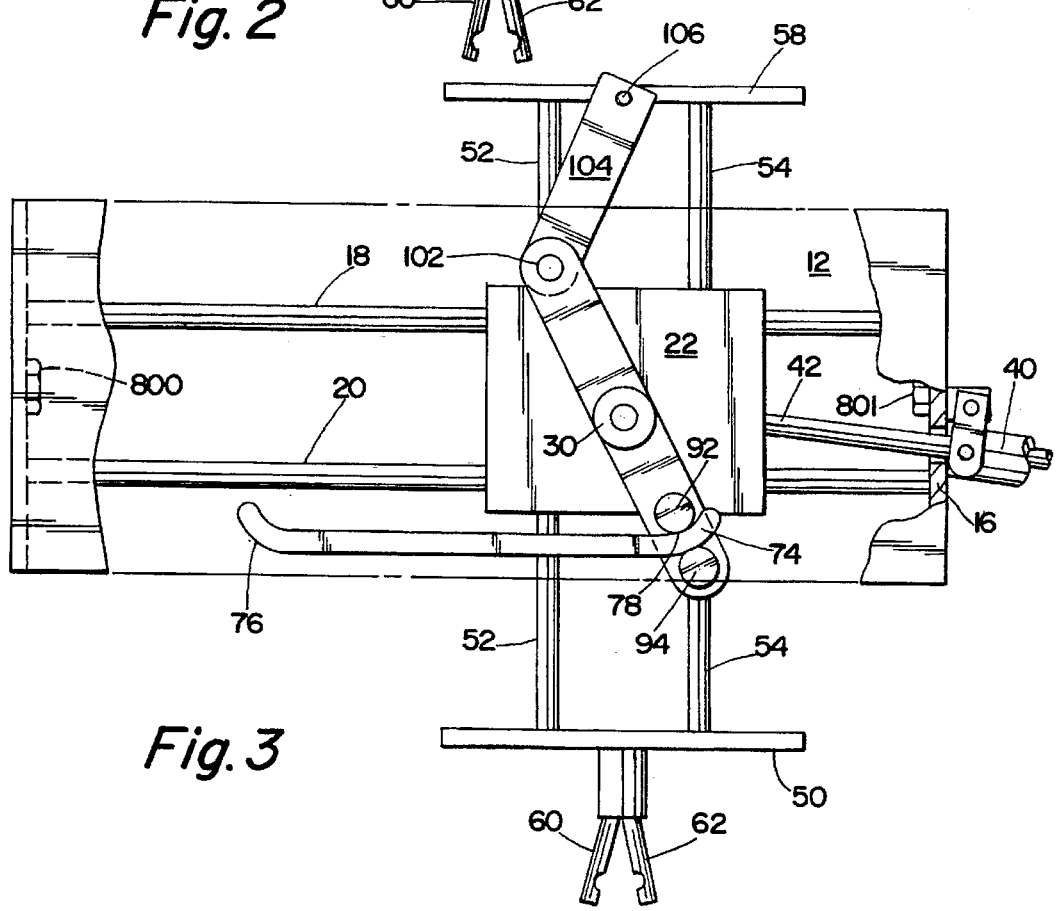
FIG. 3 is a bottom view of the retracted position of the pick and place machine shown in FIG. 1.

What is shown in FIG. 3 is again the guide rails 18 and 20 carrying the member 22 reciprocally along the rails and showing the follower arm 90 at an extreme reciprocal position with the gripper member 50 in an extended position. In FIG. 3 the actuator mechanism 40 has advanced the member 22 until stopped by stop 801 on side 16. Continued movement of the actuator 40 has rotated the center post 30 and follower arm 90. The followers 92 and 94 have traversed the curved section 76 of the guide 70. When the follower arm 90 is caused to pivot by the rotation of center post 30, the pivot point at 102 creates a forward motion on member 58. The rods 52 and 54 advance through the body 22 as shown in the linear bearings 56 and 57 such that the gripper member 50 extends to pick up a part or extend to deliver a part to the predetermined position.

Figure 4:
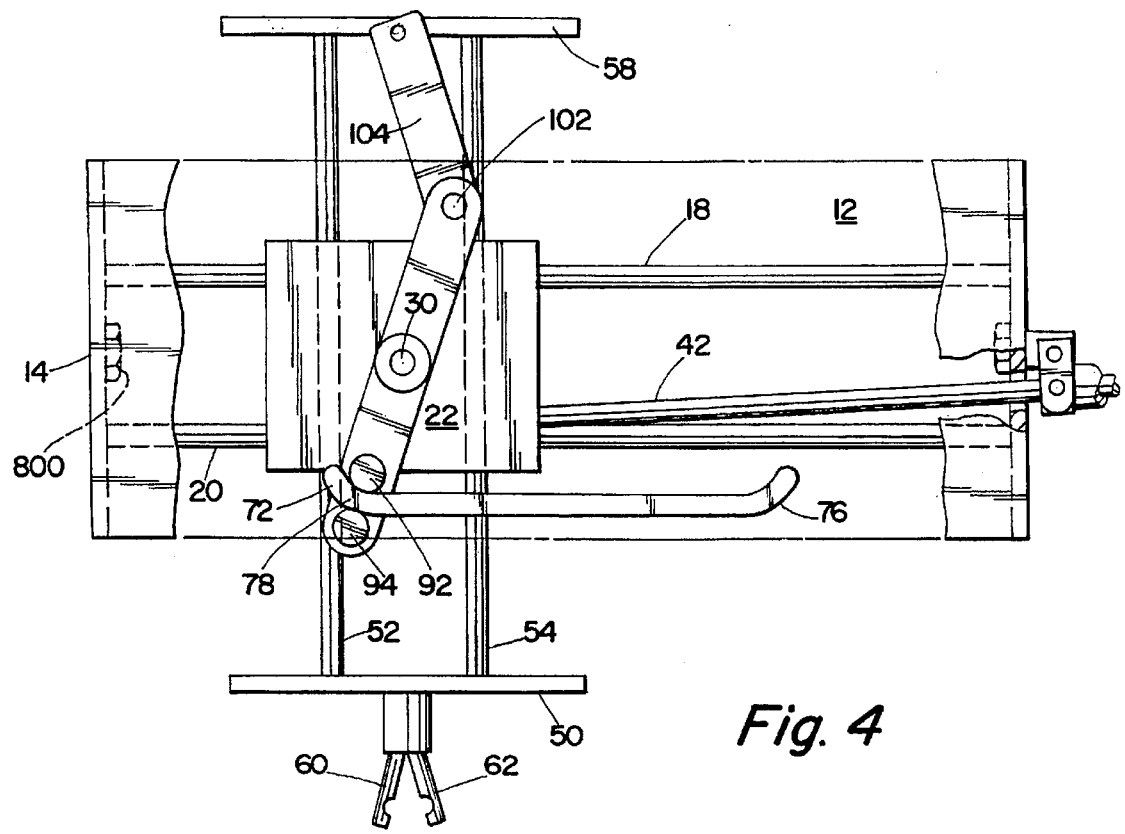
FIG. 4 is a bottom view of the pick and place machine according to the present invention.
Figure 5:
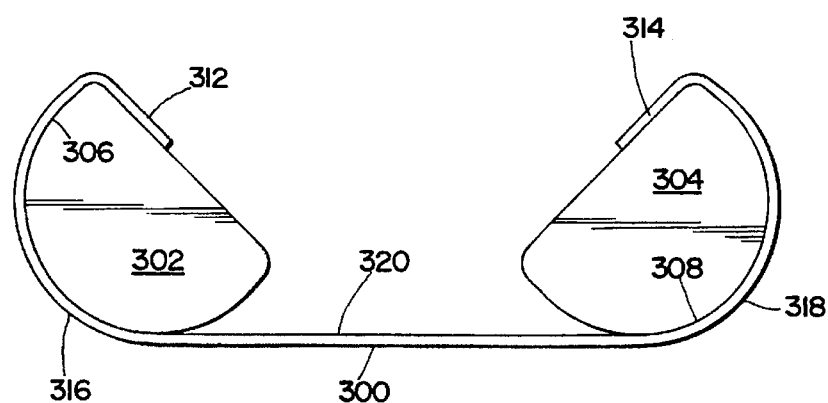
FIG. 5 is an alternate embodiment of a rail for the pick and place machine according to the present invention.

What is shown in FIG. 4 is the bottom view of the pick and place machine shown in FIG. 1. FIG. 4 shows the pick and place machine in the distal position from its initial start position depicted in FIG. 3.

When actuator rod 42 begins to move it causes actuator arm 36 to pivot. This rotates center post 30 which in turn pivots follower arm 90. As follower arm 90 pivots, the pivot point at 102 causes pivot member 104 to push member 58 away from first member 22. The rods 52 and 54 advance through first member 22 in the linear bearings 56 and 57 such that the gripper member 50 is retracted in preparation for the second direction of travel.

When followers 92 and 94 are not on curved ends 76 and 78, rotation of center post 30 stops. Continued movement of actuator arm 42 causes first member 22 to traverse the guide rails 18 and 20 until stopped by travel stop 800 located on side 14 of housing 12. The travel stop 800 is adjusted to stop first member 22 such that the followers 92 and 94 are at the tangent point of curved end 74 and straight section 77. Continued movement of actuator rod 42 causes followers 92 and 94 to travel on curved section 74 from center post 30 rotating. As center post 30 rotates, follower arm 90 pivots and followers 92 and 94 traverse the curved end 74. As follower arm 90 pivots, the pivot point at 102 causes pivot member 104 to pull member 58 towards first member 22. The rods 52 and 54 advance through the first member 22 in the linear bearings 56 and 57 such that gripper member 50 is extended to pick up or deliver a part to the predetermined position.

Figure 6:
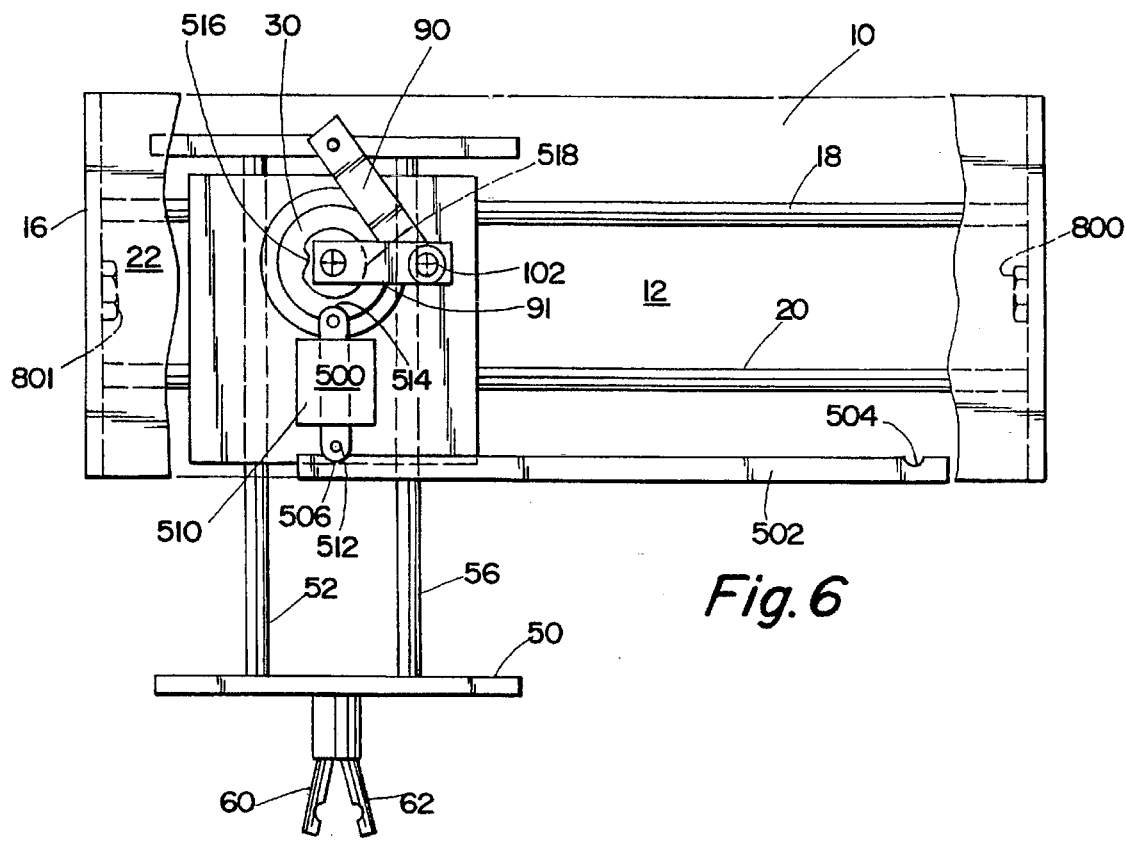
FIG. 6 is a bottom view of an alternate embodiment of the pick and place machine according to the present invention.

What is shown in FIG. 6 is an alternate view of the bottom of the pick and place machine 10 shown in FIG. 1 but this time having a detent mechanism for controlling the movement of member 22 reciprocally between the travel stops 800 and 801 on sides 14 and 16 of the housing 12. In this case the rails 18 and 20 are constructed in the same manner as previously described and the gripper member 50 has the rails 52 and 54 along with the gripper arms 60 and 62. Carrier member 22 rides along the rails 18 and 20 as previously described and there is a center post 30 extending through the block 22. In this arrangement however there is a detent mechanism at 500 and a detent rail at 502 located on the bottom surface of the housing 12. The detent rail has detents shown at 504 and 506. The detent mechanism 500 has detent member 510 with curved surfaces at 512 and 514 with the surface at 512 designed to mate with the detent surfaces at 504 and 506. Located on the center post 30 is a detent surface 516 which is designed to mate with detent surface 514. Detent member 510 is spring loaded with the spring pushing detent member 510 in the direction of center post 30. The actuator mechanism located on top of the pick and place machine and not shown in this view may be a fluidized cylinder as is shown in FIG. 1 driving an actuator arm or a rack and pinion mechanism however when the actuating force is applied it will cause rotation of the center post 30 and pivot arm 90 and 91 that are pivotally connected at 102.

Figure 7:
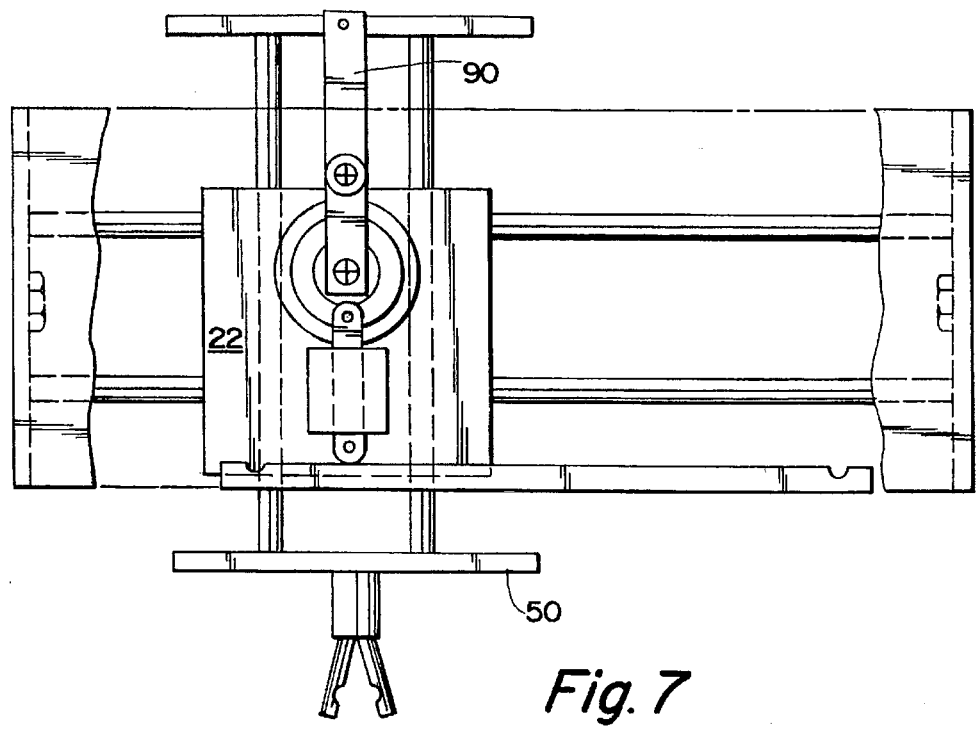
FIG. 7 is an alternate embodiment of the pick and place machine according to the present invention.

Referring now to FIG. 7, what is shown in FIG. 7 is an alternate view of the mechanism, it can be seen that the rotation of the pivot arm 90 and 91 will cause the gripper surface 50 to retract from its extended position (shown in FIG. 6) and the arms 91 and 90 will be in line with one another. When this event occurs the detent at 516 will line up with the detent surface at 514 and allow detent surface 512 to disengage from detent surface 506 shown in FIG. 6. When this occurs the member 22 will traverse horizontally along the rails 18 and 20 towards the side surface 14 of the housing 12. The stop at member 800 on side 14 will stop the travel of member 22. Continued rotation of center post 30 will cause the detent surface 512 to join with the detent surface shown at 504.

Figure 8:
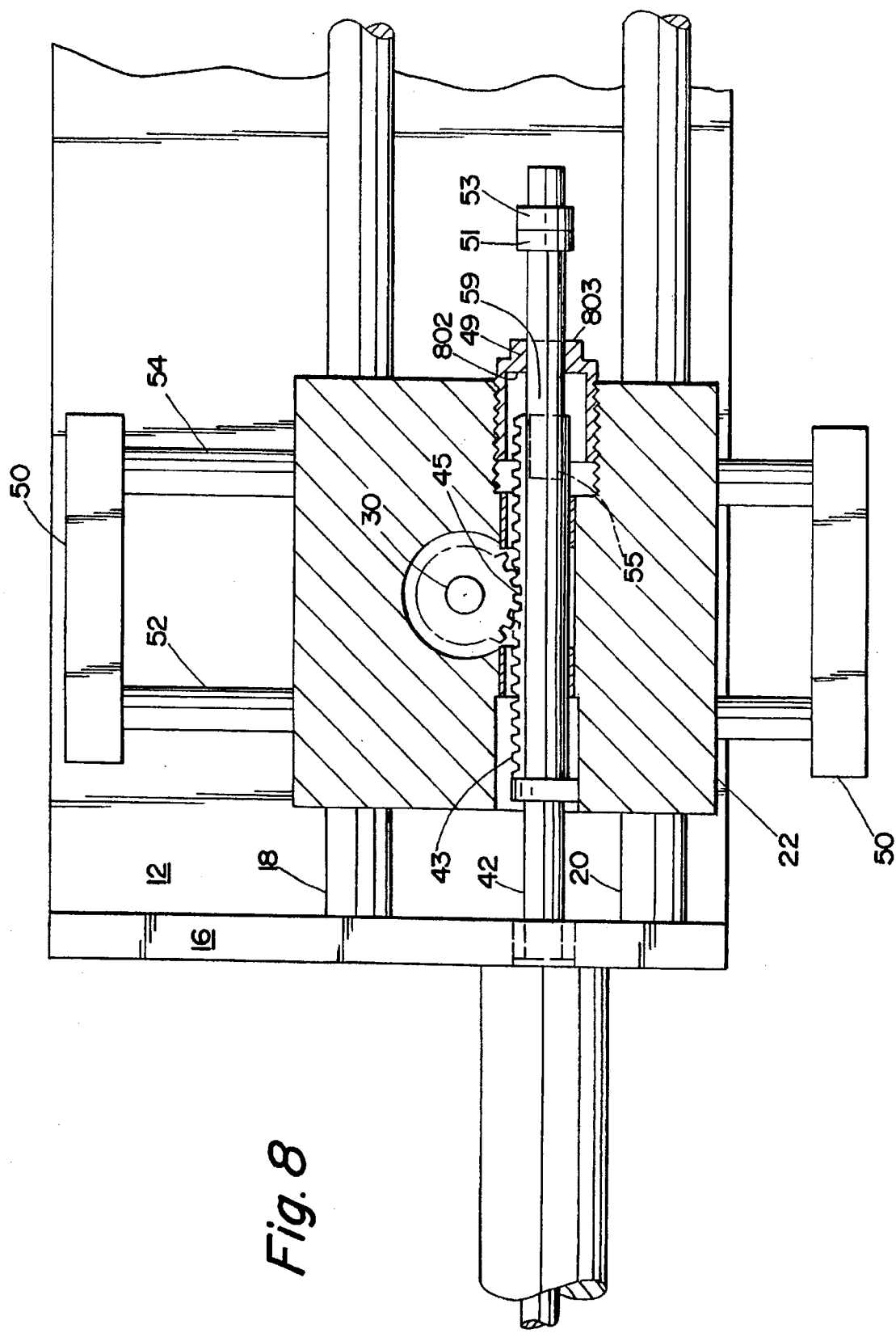
FIG. 8 is a perspective view of still another alternate embodiment of the pick and place machine according to the present invention.

What is shown in FIG. 8 is an alternate design using a rack and pinion in place of actuator arm 36. This view shows gripper member 50 in the full retracted position (followers 90 and 92 are the tangent point of curved end 76 and straight section 78) in preparation for second horizontal travel.

As shown in FIG. 8, actuator arm 42 is connected to rack gear 43. The rack gear 43 drives pinion gear 45 which is attached to center post 30. The rotation of center post 30 and the travel of the pick and place machine is the same as previously described.

Also shown in FIG. 8 is the means to adjusting the gripper extension strokes. Adjustable stop 49 is threaded in first member 22 and contains stop surfaces 802 and 803. Stop surface 802 is used to stop the travel of rack 43 as the cylinder extends towards the side opposite the actuator mounting. Adjusting the position of stop surface 803 adjusts the rack travel which in turn changes the amount of rotation of center post 30 and the amount follower arm 90 pivots. Stop surface 803 is for contact with the adjustable stop nuts 51 and 53. The adjustable stop nuts 51 and 53 are on a threaded rod which is attached to rack 43 at the opposite end from the actuator rod attachment. Rack 43 has a tapped threaded hole for receiving threaded rod 59. Adjusting these stop nuts 51 and 53 limit the rack travel in the direction of the side where actuator is mounted which in turn changes the amount of rotation of center post 30 and the amount follower arm 90 pivots.

I claim:

1. A pick and place machine operable to pick up a part at a loading station and thereafter to place and release the part in a delivery station spaced at least horizontally from said loading station comprising:
   a. a housing;
   b. a first member supported by said housing for free horizontal reciprocal movement on said housing with respect to said stations;
   c. a second member supported by said first member for reciprocal movement between said first member and said stations;
   d. a rotatable post with opposing ends mounted through said first member and having an actuating link on one end and a follower arm on said opposing end;
   e. said follower arm having opposing ends with follower means on one end and a pivot mechanism connected to said second member on said other end;
   f. guide means on said housing for engaging said follower means;
   h. co-operating elements of abutment means on said guide means and said follower means; and
   i. actuator means mounted on said housing for reciprocal actuation of said actuating link.

2. The pick and place machine according to claim 1 in which said guide means comprises an elongate rail mounted on said housing with said rail having two opposing radiused ends.

3. The pick and place machine according to claim 1 in which said guide means comprises two radiused discs spaced a predetermined distance apart on the housing and a band of thin metal material extending on the periphery of the discs and between said discs.

4. The pick and place machine according to claim 1 in which said actuator means comprises a piston-cylinder apparatus mounted on said housing and connected to said actuating link.

5. The pick and place machine according to claim 1 in which said actuating link comprises a pinion and said actuator means comprises reciprocal moving rack and pinion means.

6. The pick and place machine as described in claim 1 in which said actuating link comprises an actuator arm.

* * * * *